May 29, 1962
J. MARTIN
3,036,798
CUTTER UNIT PRIMARILY FOR USE IN
EJECTION SEATS FOR AIRCRAFT
Filed March 10, 1959
3 Sheets-Sheet 3
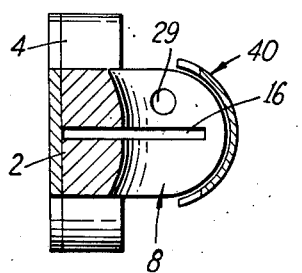
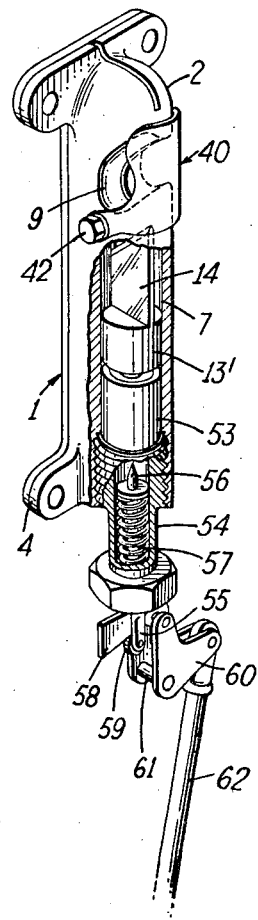
Inventor
JAMES MARTIN
By Kurt Kelman
his AGENT 3,036,798
CUTTER UNIT PRIMARILY FOR USE IN EJECTION
SEATS FOR AIRCRAFT
James Martin, Southlands Manor, Southlands Road,
Denham, near Uxbridge, England
Filed Mar. 10, 1959, Ser. No. 798,488
Claims priority, application Great Britain Mar. 14, 1958
4 Claims. (Cl. 244—141)

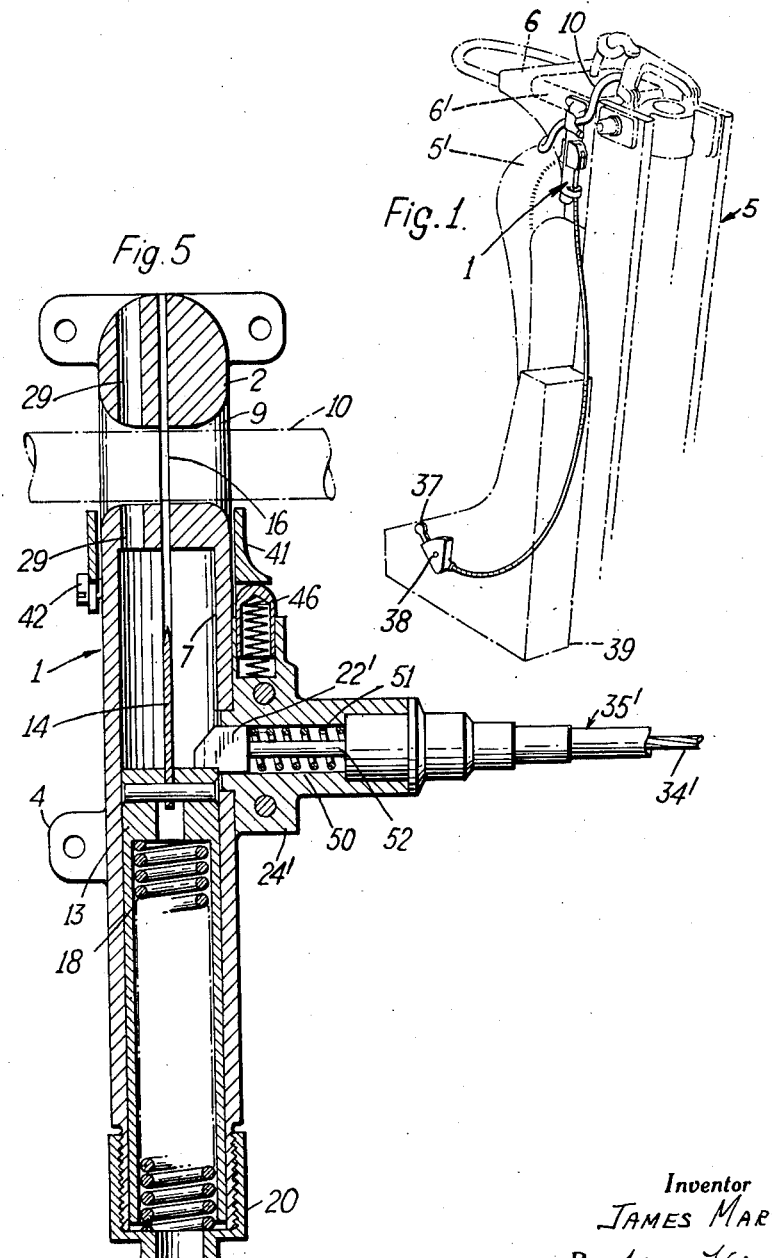

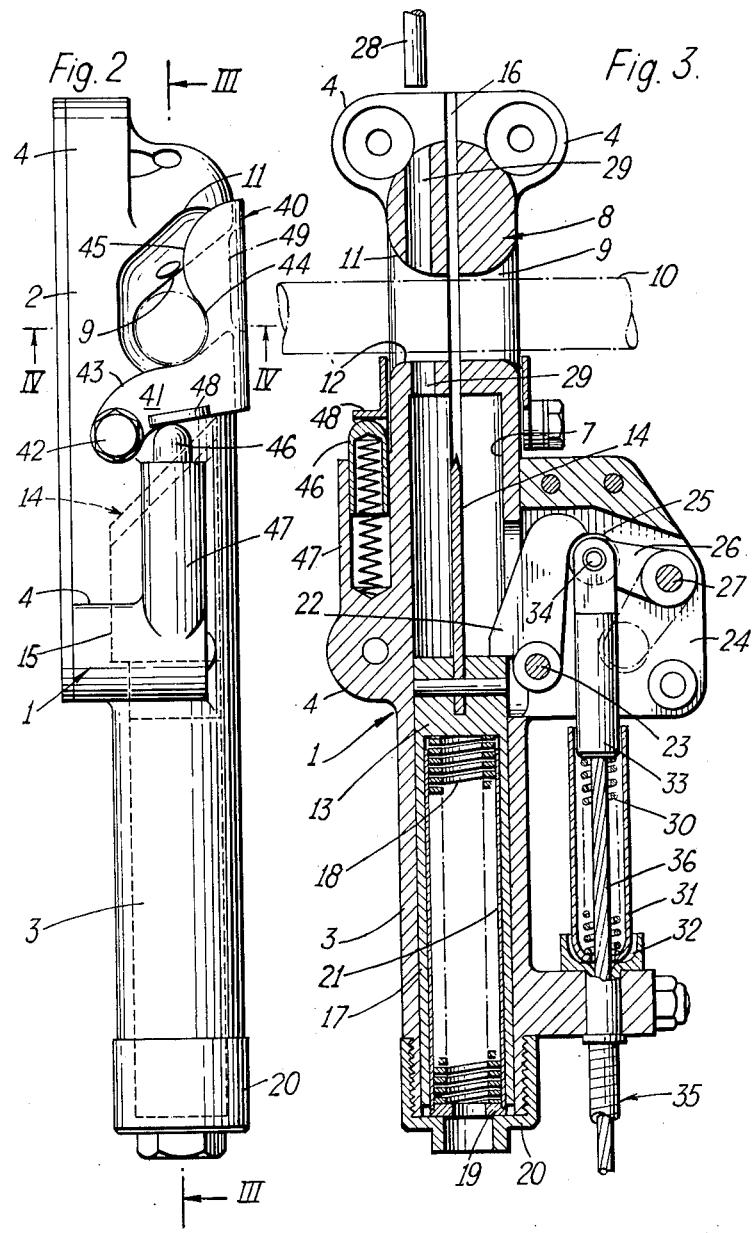

This invention concerns a cutter unit for severing a line or cable and is particularly concerned with severing, in an emergency, the parachute withdrawal line or cable leading from a drogue parachute to another parachute. Thus the invention is especially applicable to ejection seats for aircraft and of the type in which, on the seat being launched from the aircraft, a drogue parachute is deployed to slow down and change the attitude of the seat before the airman is separated from the latter, and wherein the drogue parachute line or cable is, besides being connected to the ejection seat, also connected to the airman's or seat occupant's main or personal parachute so that, on the drogue parachute being released from the ejection seat, it automatically withdraws the said main or personal parachute for deployment. Such an arrangement is described in Patent No. 2,708,083.

In certain circumstances the airman or seat occupant may wish quickly to disconnect has parachute from the drogue parachute cable. One such circumstance would be where automatic mechanism provided on the ejection seat for releasing the drogue line or cable from the seat failed to operate, when it would become urgently necessary for the airman or seat occupant to separate his personal parachute from the drogue parachute. To provide for such an eventuality, in the arrangement described in the Patent No. 2,708,083 the line or cable for connecting the drogue parachute to the airman's or seat occupant's personal parachute is formed in two separable parts connected by a fastening which can be released by the operation of a manual control member, one such arrangement being described with reference to FIGURES 12 to 15 of the said patent.

Whilst the said arrangement for separating the airman's or seat occupant's personal parachute from the drogue parachute, and consequently from the seat, in an emergency, has been found to work satisfactorily, nevertheless it would be better and generally sounder policy if separable connections in the withdrawal line of the airman's or seat occupant's parachute could be eliminated or reduced to a minimum, and one of the objects of this invention is to provide a means where this desideratum can be achieved.

According to this invention, there is provided a cutter unit for severing a line, such unit comprising a cutting head defining an open-sided recess to receive and normally to locate a portion of the line, a knife mounted for guided movement through said recess transversely thereof for severing said line, means for forcibly impelling said knife across said recess to sever the line therein when desired, and means for controlling the operation of said impelling means.

The knife may be pivotally associated with the housing and act with a rotary movement, but preferably it is of a reciprocable or guillotine type.

According to a further feature of the invention, the cutting head forms a portion of a housing in which is reciprocably mounted a carrier to which said knife is affixed, and which is also provided with means for forcibly impelling said carrier and knife towards said line receiving recess.

The knife may be impelled in the cutting direction at the appropriate time by spring or fluid pressure, e.g. gas pressure. Where gas pressure is employed, this may be generated by detonating an explosive charge in said housing.

Where the knife carrier is spring-actuated, appropriate detent means may be provided for holding the knife carrier in a cocked position, appropriate release means being provided for freeing the carrier when desired, and such release means conveniently being controlled by direct cable or other linkage from a manually operable control member which is preferably situated at a position remote from the cutter unit for conveniently disposed for operation by the airman or seat occupant in an emergency.

A protective and retaining cover may be provided for normally bridging over the part of the line located in the recess, said cover being displaceable to permit the initial location of the line in said recess and also to permit the withdrawal of the line from the recess in normal circumstances.

When a cutter unit as above described is incorporated in an aircraft ejection seat, the manual control member is preferably arranged also to effect other operations, such as the release of seat harness, leg restraining and arm restraining lines.

In order that the nature of the invention may be more readily appreciated, certain embodiments of the same will now be described by way of example with reference to the accompanying drawings, in which:

FIGURE 1 is a fragmentary perspective view illustrating the invention applied to an aircraft ejection seat of the Martin-Baker type;

FIGURE 2 is a side elevation of a line cutter unit constructed in accordance with the invention;

FIGURE 3 is a section on line III—III of FIGURE 2;

FIGURE 4 is a section on line IV—IV of FIGURE 2;

FIGURE 5 is a view similar to FIGURE 3 but showing a modified construction of a line cutter unit; and FIGURE 6 is a perspective view showing a still further modified embodiment of a cutter unit according to the invention.

Referring first to FIGURES 2, 3 and 4, it will be seen that the line cutter unit therein illustrated comprises an elongated housing 1 of which the upper part 2 is of approximately D-shaped horizontal cross-section whilst the lower part 3 is of cylindrical cross-section. At its rear the upper part 2 of the housing 1 is furnished with lugs 4 by which it may be bolted to the upper part of the side of the frame of an aircraft ejection seat 5 carrying a main or personal parachute 5', or to a part on such frame such as, for example, a drogue parachute housing 6 enclosing a drogue parachute 6' (see FIGURE 1).

For the major part of its length and extending from the lower end thereof, the housing 1 is furnished with a cylindrical bore 7 coaxial with the cylindrical part 3 of the housing whilst above this bore the housing constitutes a substantially solid cutting head 8 having a transverse deeply incised, downwardly and rearwardly sloping round bottomed recess 9 to receive a line or cable 10 serving, in this case, to connect the drogue parachute 6' to the personal parachute 5' for an occupant or airman using the aircraft ejection seat.

The axis of the line-receiving recess 9 is at right angles to the axis of the cylindrical lower part 3 of the housing 1 and is intersected by the latter axis. Moreover all the upper and lower corners 11 and 12 of the recess are heavily radiused to avoid chafing of the line 10.

The bore 7 within the housing 1 extends upwardly to within a short distance of the bottom of the line-receiving recess 9 as will be seen clearly from FIGURE 3 and in this bore is reciprocably mounted a cylindrical plunger 13 constituting a knife carrier and in the upper end of which is replaceably diametrically fixed an upstanding knife 14 comprising a blade having its upper rear part 15 projecting into and guided in a narrow slot 16. This slot extends longitudinally of the housing 1 and is located in the same diametrical plane of the bore 7 as the knife blade, the engagement of the latter in the slot 16 preventing rotation of the plunger 13 and the knife blade in the bore 7 and maintaining the width of the blade at right angles to the axis of the lower end of the recess 9 in the cutting head 8 of the unit.

The lower part of the slot 16 is formed only in the rear wall of the housing 1 but in the cutting head the slot extends from the rear surface of the housing almost to the front of the latter as is clearly seen from FIGURE 4.

The plunger 13 is furnished with an elongated hollow cylindrical skirt 17 within which is located a powerful compression spring 18 engaging at its upper end against the underside of the plunger 13 and at its lower end against a washer 19 supported by a centrally apertured end cap 20 screwed on to the bottom of the cylindrical lower part 3 of the housing 1, said spring being surrounded by a sleeve 21 of which the lower end engages or is carried by the washer 19 whilst the upper end is spaced somewhat below the lowest position to which the plunger 13 may be moved in the housing 1. The skirt 17 on the plunger 13 serves to maintain the plunger truly coaxial in the bore 7 as the plunger slides up and down the latter.

The upper cutting edge of the knife 14 is oblique to the axis of the bore 7 and roughly parallel to the upper and lower walls of the line-receiving recess 9, the knife 14 operating in the manner of a guillotine.

The knife 14 serves, in certain circumstances as hereinafter explained, to sever the line 10 located in the recess 9 but is normally held in the cocked position shown in FIGURE 3 when the spring 18 is under heavy compression.

As shown in FIGURE 3, the knife carrier or plunger 13 is held in the cocked position by means of a detent or latch 22 pivoted on a horizontal pin 23 carried at its ends by the side walls or cheeks of a hollow bracket 24 projecting laterally from the rear of the housing 1, the detent being adapted to be held in the cocked position by means of a roller 25 carried on one end of a crank arm 26 pivotally mounted at its other end on a pin 27 located between the walls or cheeks of the hollow bracket 24.

The crank arm 26 co-operates with the detent or latch 22 on the over-dead-centre principle, the arrangement being such that, when the axis of the roller 25 is located above the horizontal plane containing the pivot pin 27 for the crank arm 26, the detent or latch 22 is retained in a position to retain the plunger 13 cocked, but when the crank arm 26 is swung downwardly to a position below the said horizontal plane, the force of the compression spring 18 may, through the plunger 13, swing the detent or latch 22 aside, allowing the knife 14 to ascend rapidly and thereby forcibly to sever line 10 located in the transverse line-receiving recess 9.

In moving the crank arm 26 from the cocked position shown in FIGURE 3 to the released position such as indicated in dotted lines in FIGURE 3, it is necessary for the detent or latch 22 at first to move slightly inwards towards the knife blade 14 with the consequential slight depression of the plunger 13 in the bore 7, the skirt 17 of the plunger being for this purpose constructed so as to permit this degree of initial downward movement of the plunger. For a similar purpose the sleeve 21 terminates somewhat short of the underside of the plunger 13.

Cocking of the plunger 13 and knife 14 is conveniently achieved by means of a cocking rod 28 of which a portion only is shown in FIGURE 3 and which is adapted to be inserted into the bore 7 by passing it through an eccentric vertical passage 29 formed in the cutting head 8, the plunger 13 being depressed to its maximum limit during this cocking operation so that the detent or latch 22 may swing fully into and inwardly beyond its cocked position to permit of the return of the roller 25 to the upper position shown in FIGURE 3, such return being effected at this time by means of a compression spring 30 housed in a cylindrical casing 31 and acting between the base of said casing (which rests in a cuplike support 32) and the lower end of a forked link 33 embracing the crank arm 26 and its roller 25 and connected to such arm by a pin 34 carrying the roller.

The operation of the crank arm 26 to release the detent or latch 22 is achieved in the example illustrated through the medium of a Bowden cable assembly 35 to which an inner cable 36 is connected by the forked link 33.

The end of the inner cable 36 opposite to the link 33 is attached to a manual control lever 37 (FIGURE 1) mounted in a housing 38 fixed to one side of the seat pan 39 of the ejection seat 5. The use of a flexible cable for connecting the crank arm 26 to the manually operable lever 37 enables the seat pan 39 to be adjusted on the frame of the seat 5 without interfering with the operation of the line cutting unit. However this can be achieved by the use of a suitable linkage and telescopic torque shaft mechanism if desired.

Desirably the manual control lever 37 will be that used to control other mechanisms of the ejection seat. Thus this control lever may additionally constitute an over-riding manual control for performing the release, in an emergency, of the seat harness normally holding the airman or seat occupant in the ejection seat, and for simultaneously releasing leg and/or arm restraining means. Thus the manual control lever 37 can be combined with the manual over-riding control lever performing the above named functions in an ejection seat constructed and operating as described in the patent application No. 720,759.

Normally to retain the parachute line 10 in the downwardly indicated recess 9 in the cutting head 8 of the cutter unit and to protect the line whilst permitting it readily to be inserted laterally, i.e. transversely of the axis of, into or withdrawn laterally from the recess when required, a hinged or pivoted cover member 40 of substantially U-shaped horizontal cross-section is provided to bridge the mouth of the recess 9, this cover member being shaped to match the front shape of the housing 1 and being furnished with a pair of wings 43 embracing between them the upper part 2 of the housing 1, the cover member being pivotally attached to the housing by studs 42 at a position below and behind the base of the recess 9 as is very clearly seen from FIGURE 2.

The rear edges 43 of the side cheeks of the cover member 40 are of a sinuous shape so that the lower parts 44 are complementary to the circular form of the base portion of the line-receiving recess 9, whilst the upper parts 45 of said edges are reversely curved so that, when the withdrawal line 10 is pulled, transversely of its length, from the recess 9, the line tends to swing the cover member 40 outwardly and downwardly to uncover the mouth of the recess.

Spring means are provided to maintain the cover member in its closed position: conveniently these means comprise a spring-urged plunger 46 slidably mounted in a boss 47 extending longitudinally along one edge of the housing 1, the plunger having a rounded upper end and abutting against a lug 48 projecting laterally from one of the side arms 41 of the pivoted cover member 40 so that the latter is always urged into its closed position but can yield under the exercise of force applied to it from its inner side and in a direction in a plane substantially perpendicular to the pivoting axis of the cover member and the axis of said housing.

To provide for ready inspection of the condition of the mechanism, e.g. to make it possible to see whether or not inadvertent damage to the line 10 has taken place, a vertical central aperture or slot 49 may be provided in the cover member 40 opposite the line-receiving recess 9 and in register with the knife slot 16.

The modified cutter unit illustrated in FIGURE 5 is, in the main, of the same construction as that shown in FIGURES 2 to 4 with the exception that the form of the knife carrying plunger retaining detent or latch is of a modified construction. Since the constructions are substantially the same, the same reference numerals are used in the drawing for corresponding parts, modified references being employed only where reference is made to modified parts.

In this modified construction the plunger 13 is retained in the cocked position by a detent or latch 22' which is slidably mounted in a bore 50 normal to the axis of the bore 7 of the housing 1 and provided in a bracket 24' projecting laterally from the housing between the ends thereof. The detent or latch 22' is urged inwardly by a compression spring 51 located in the bore 50 and around a stem 52 on the inner end of which the detent or latch 22' is carried, this stem being connected to the inner cable 34' of a Bowden cable assembly 35' corresponding to the assembly 35 and connected to the lever 37 of the manual over-ride control assembly previously described. It will be apparent that withdrawal of the detent or latch 22' from the bore 50 frees the plunger 13 for effecting the severing of the line 10.

The alternative arrangement shown in FIGURE 6 differs from those shown in FIGURES 2 to 4 and FIGURE 5 respectively only in the method of operating the knife carrying plunger. In describing this construction only the modified parts will be given new reference numerals.

In this alternative arrangement the plunger 13' is in the form of a piston that slides in the bore 7 which constitutes a cylinder for the piston 13' having a gas-tight sliding fit in the cylinder, being provided, if desired, with sealing rings (not shown). The lower part of the bore 7 forms a breech chamber for receiving a cartridge 53 containing an appropriately chosen combustible powder and furnished at its lower end with a detonator as is usual in cartridges of an explosive character.

Into the lower end of the bore 7 is screwed a breech block 54 in which is axially mounted a slidable plunger 55 which is provided with a firing pin 56 at its upper end and is urged in a firing direction by a compression spring 57, the plunger 55 being normally retained in a cocked position by means of a wedge-shaped sear 58 passing through the bifurcated lower end of the plunger 55, the lowermost part of the plunger being furnished with a roller 59 against which under edge of the sear 58 engages. The withdrawal of the sear 58 to free the plunger 55 may be effected in any suitable manner as by a bellcrank lever assembly 60 pivoted at 61 to a fixed part of the ejection seat 5, the bellcrank lever 60 being operated from the control lever 37 through a linkage 62 or a Bowden cable assembly such as hereinbefore described.

It will be appreciated that as the sear 58 is withdrawn the plunger 55 is at first partially withdrawn from the breech block 54 thereby further compressing the spring 57, and then released so as to be forcibly driven upwardly by the spring, thus causing the firing pin 56 to detonate the cartridge 53 and thereby to effect the rapid generation of gas pressure adequate to propel the plunger or piston 13' violently upwards to cause the knife 14 to sever a line in the recess 9.

As has been explained above, a cutting unit according to any of the embodiments of the invention is particularly suitable for use in an aircraft ejection seat for the purposes already explained and, as well as residing in the cutting unit itself, the invention also resides in provision of an aircraft ejection seat having such a cutting unit for the purposes above described.

In modern ejection seats for aircraft such as are produced by the Martin-Baker Aircraft Company Limited (and of which some are described in Patents Nos. 2,751,171, 2,836,382, 2,806,664, 2,808,217, 2,836,222) seat harness means are provided for holding the airman or seat occupant in his ejection seat and for automatically releasing him from the seat harness after the launching of the seat from the aircraft and the deployment of the drogue parachute. Furthermore means are preferably provided for restraining the legs and/or arms of the airman or seat occupant against forcible displacement when the ejection seat is launched from the aircraft, whilst leaving the airman or seat occupant full freedom of movement in his arms and legs in normal circumstances. In addition the release of the said seat harness and leg or arm restraining means is preferably performed automatically subsequent to the launching of the seat. Also a manual over-ride control lever is preferably provided whereby all these mechanisms can be released by manual control in the unlikely event of the automatic mechanism failing to operate; the said over-ride control lever may be combined with the over-ride control lever 37 above described for use in releasing the detent or latch 22, 22' or for effecting the withdrawal of the sear 58.

I claim:

1. In an aircraft ejection seat including a main parachute, a drogue parachute, and a draw line having connections with the main parachute and the drogue parachute and being releasably connected to the ejection seat at a point between its connections with said parachutes: a cutter unit for severing said draw line so as to release the main parachute from the seat in an emergency, said unit comprising a cutting head defining an open-sided recess adapted so to receive and locate a part of said draw line extending between the main parachute and the ejection seat that the draw line may be engaged in and withdrawn from said recess by movement in a direction at right angles to the axis of said line, a cover member movably mounted on said cutting head; resilient biasing means connecting said cover member to said cutting head and acting continually to urge cover member into a position in which said member closes the open side of said recess, the tension of said biasing means being such as normally to prevent displacement of said cover member from the recess closing position thereof and consequent release of the draw line from said recess, but such as to permit displacement of said cover member by said draw line upon the forceful movement of the latter transversely of its axis during a normal seat ejection; a knife mounted for guided movement through said recess, means for forcibly impelling said knife through said recess, and means for controlling the operation of said impelling means.

2. In an aircraft ejection seat including a main parachute, a drogue parachute, and a draw line having connections with the main parachute and the drogue parachute and being releasably connected to the ejection seat at a point between its connections with said parachutes: a cutter unit for severing said draw line so as to release the main parachute from the seat in an emergency, said unit comprising a cutting head defining an open-sided recess adapted so to receive and locate a part of said draw line extending between the main parachute and the ejection seat that the draw line may be engaged in and withdrawn from said recess by movement in a direction at right angles to the axis of said line, a cover member mounted on said cutting head and movable responsive to pressure of a draw line in said recess in said direction from an operative position in which it closes the open side of said recess to an out of the way position in which said recess is open; resilient biasing means connecting said cover member to said cutting head and acting to urge said cover member into its operative position, the inner surface of said cover member being cam shaped so that contact of said draw line therewith upon the application of withdrawal movement to such line transverse to the axis of the line will cause the cover member to be displaced against the action of said biasing means so as to release the draw line; a knife mounted for guided reciprocal movement relatively to said recess, means for forcibly impelling said knife through said recess, and means for controlling the operation of said impelling means.

3. In the aircraft ejection seat of claim 1, the knife impelling means comprising a gas pressure operated piston associated with said knife for moving the latter in a line cutting direction, a combustion chamber adapted to receive a detonatable explosive cartridge, conduit means for conveying gas pressure generated in said combustion chamber to said piston, and a firing mechanism for detonating said cartridge, the controlling means for operation of the piston being operatively connected to the firing mechanism.

4. In the aircraft ejection seat of claim 3, a sear connected to the controlling means for actuating the firing mechanism.

References Cited in the file of this patent

UNITED STATES PATENTS

| | | |
|---|---|---|
| 2,708,083 | Martin | May 10, 1955 |
| 2,722,740 | Hubbard | Nov. 8, 1955 |
| 2,755,550 | Benjamin | July 24, 1956 |
| 2,762,588 | Martin | Sept. 11, 1956 |
| 2,778,587 | Moran | Jan. 22, 1957 |
| 2,863,214 | Szappanyos | Dec. 9, 1958 |
| 2,897,799 | Stupian | Aug. 4, 1959 |